Oct. 9, 1956  D. J. K. STUART  2,765,893
HYDRAULICALLY OPERATED CLUTCH MECHANISMS
Filed Feb. 9, 1953
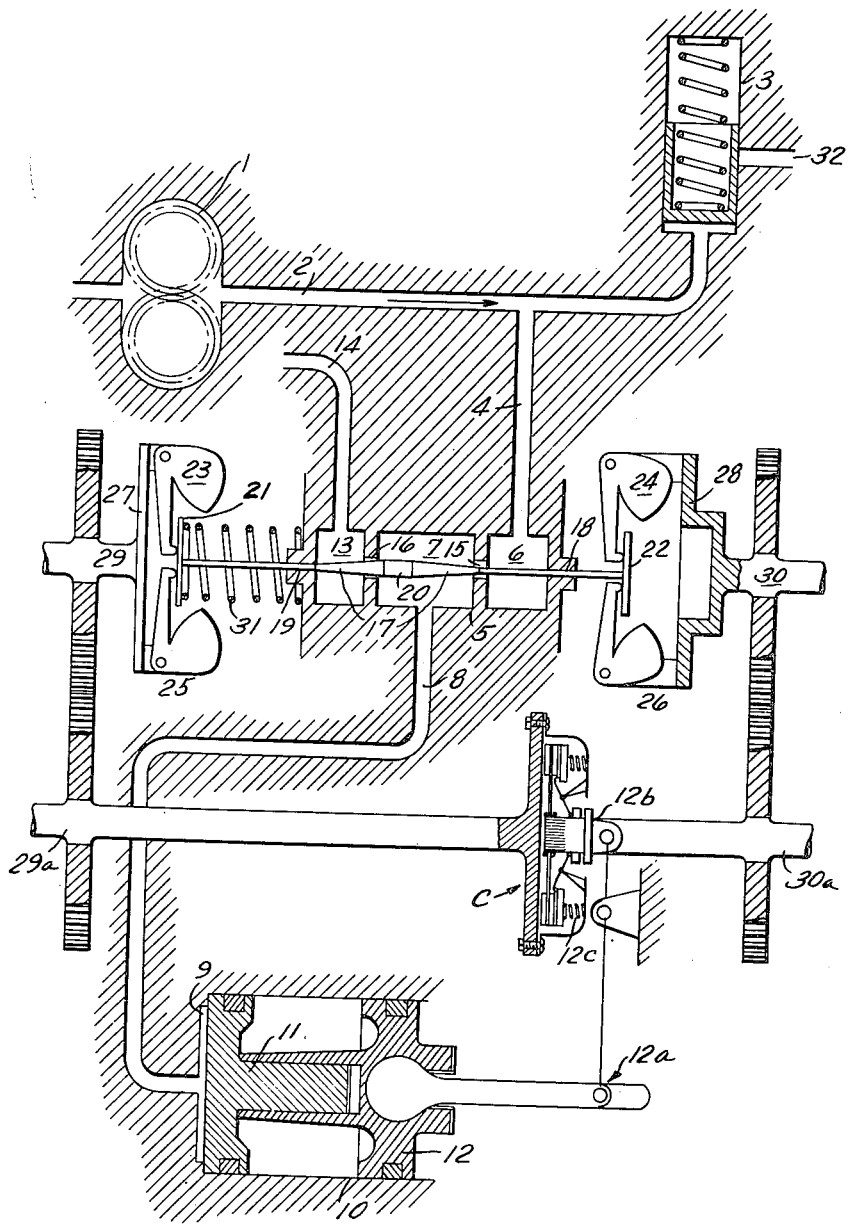
INVENTOR
DUNCAN J. K. STUART
BY Scrivener and Parker,
ATTORNEYS

United States Patent Office 2,765,893
Patented Oct. 9, 1956

2,765,893
HYDRAULICALLY OPERATED CLUTCH MECHANISMS

Duncan J. K. Stuart, Northfield, Birmingham, England, assignor to The Austin Motor Company Limited, Northfield, Birmingham, England Application February 9, 1953, Serial No. 335,683

Claims priority, application Great Britain February 12, 1952

2 Claims. (Cl. 192—103)

This invention relates to hydraulically operated clutch mechanisms in which a friction type clutch operated by a hydraulic motor is embodied in an automobile or other power transmitting drive.

In a hydraulically operated clutch mechanism of this kind and according to the present invention, the hydraulic motor piston, which is spring-loaded for clutch engagement and against clutch disengagement in the usual way, is subjected, either directly or through the cooperation of an auxiliary piston, to the fluid pressure prevailing in a modulated pressure chamber, which pressure is regulated by a valve directly operated by a speed sensitive device responsive to the rotational speed of the power unit, said valve operating to control simultaneously the pressure drop between a high pressure chamber and the modulated pressure chamber on the one hand and the pressure drop between the latter chamber and an exhaust pressure chamber on the other hand. The arrangement is such that, when the rotational speed of the power unit rises above a predetermined value, the pressure in the modulated pressure chamber will fall and control the engagement of the clutch under the action of the spring loading, and, when the rotational speed of the unit falls below a predetermined value the pressure in the modulated pressure chamber will increase to cause the clutch to disengage.

The invention affords sensitive control of the clutch when starting up from rest and when slowing down to stop, minimizes clutch slip, and allows the pressure between the friction elements of the clutch to be maintained at any desired value up to the maximum.

According to a further feature of the invention a second speed sensitive device responsive to the speed of either a shaft driven by the output side of the clutch (identified with the first motion shaft in the normal type gear box) or a shaft driven by the output side of the gear box (identified with the third motion shaft in the normal type gear box) may be provided, said second speed sensitive device acting in conjunction with the first speed sensitive device to assist in controlling the movement of the valve, itself controlling the pressure in the modulated pressure chamber. This second speed sensitive device is alone capable of moving the valve to provide a simple overriding clutch control when the over-run condition prevails and acting together with the first speed sensitive device accelerates clutch engagement once the vehicle is in motion thereby minimizing clutch slip and also providing a hysteresis effect which lowers the speed at which the clutch disengages when the vehicle is slowed down or brought to rest.

This device is particularly advantageous in its application to hydraulic clutch mechanisms in which the same friction clutch is operated automatically by hydraulic means during changes of ratio in a gear box interposed in the transmission.

In an embodiment of the invention as applied to an automobile power transmission incorporating a fully automatic hydraulic system of clutch control during gear shifting operations, two speed sensitive devices are arranged to impart linear movement to the control valve. These speed sensitive devices may be of the centrifugally weighted arm type. If a constant displacement engine driven type of oil pump is used for supplying the hydraulic circuit the speed sensitive device may be controlled by the rate of oil flow from such a pump. The control valve may be in the form of a needle valve sliding through two circular orifices or may alternatively take the form of a rod incorporating specially designed slots.

One form of this invention applied to an automobile transmission and incorporating centrifugally weighted arm speed sensitive devices imparting linear motion to a needle valve is shown diagrammatically in the single figure of the drawing.

Referring in detail to the drawing an engine driven pump of the constant displacement type 1 delivering fluid under pressure through passage 2 to relief valve 3 and thence through passage 4 to high pressure chamber 6 of control valve body 5. Modulated pressure chamber 7 of control valve body 5 is connected by passage 8 to space 9 in cylinder 10. Piston 11 in cylinder 10, operates directly through a rod and lever or, as is shown in the drawing, against piston 12 and thence through a rod and lever connection 12a to the clutch withdrawal mechanism 12b of the clutch C. Piston 12 as shown represents part of hydraulic mechanism for operating the clutch during gear shifting and piston 11 sliding also within cylinder 10 will come into contact with piston 12 and force it to the right causing disengagement of the clutch when space 9 is pressurised. This double piston arrangement illustrates a convenient method of adaption of this invention to a hydraulically operated clutch system. The action of the system comprising the invention is such as to override the other hydraulic system so as to cause speed sensitive declutching and permit gradual clutch engagement through the action of piston 11.

Valve body 5 contains in addition to high pressure chamber 6 and modulated pressure chamber 7 a third compartment, exhaust pressure chamber 13, connected by passage 14 to a low pressure fluid reservoir (not shown) from which pump 1 draws its supply. Chambers 6 and 7, and chambers 7 and 13, are interconnected by circular orifices 15 and 16 in their common dividing walls. Orifices 15 and 16 are in line and through them slides needle valve 17 which also slides through holes 18 and 19 in the end walls of the valve body 5. Valve 17 is of the needle type tapering outwards from its central part 20 which is the point of maximum diameter. This needle is tapered so that it will seat in one or other of orifices 15 and 16 at the limits of its movement.

Needle valve 17 is extended at its ends to carry flanges 21 and 22 having thrust faces on which the feet of weighted arms 23 and 24 of centrifugal devices 25 and 26 bear. Carriers 27 and 28 of centrifugal devices 25 and 26 are driven rotatably by shafts 29 and 30, and by suitable toothed gears or other means from the engine and clutch output members 29a and 30a respectively. Between flange 21 and valve body 5 is interposed spring 31 which acts so as to force needle valve 17 to the left causing the tapered portion to seat in orifice 16 thus sealing off the connection between modulated pressure chamber 7 and exhaust pressure chamber 13. In this condition high pressure fluid (this pressure being controlled by relief valve 3) enters high pressure chamber 6 through passage 4 and flows through the annular gap between needle 17 and orifice 15 into modulated pressure chamber 7 and thence through passage 8 to space 9 in cylinder 10. Piston 11 will then be forced to the right under this fluid pressure and against piston 12 and also against the resistance of the normal clutch pressure springs 12c. The fluid pressure at which relief valve 3 starts to by-pass fluid back to the reservoir is set so that this same pressure acting on piston 11 is sufficient to completely disengage the clutch C.

At engine idling speed the centrifugal action on weighted arms 23 of mechanism 25 produces an axial force on flange 21 tending to move needle valve 17 to the right against the resistance of spring 31. Spring 31 is, however, arranged with a pre-load so that movement of needle valve 17 will not take place under the action of mechanism 25 until the engine has risen considerably above its idling speed. When this critical engine speed is reached the needle valve 17 starts to move to the right causing the tapered portion to unseat at orifice 16 and permitting a small flow of fluid through the gap produced between this orifice and the tapered needle, this flow being in the form of a continuous circulation through pump 1 and through chambers 6, 7 and 13 in the valve body. Since the outlet pressure of pump 1 is maintained constant by relief valve 3 from which excess fluid spills back to the reservoir through passage 32 and the reservoir pressure is virtually equal to atmospheric, the pressure drop across the two orifices is also constant. The modulated pressure in chamber 7 will thus depend on the relative resistances offered by orifices 15 and 16 these resistances being inverse functions of the effective orifice areas. The ratio of these areas is controlled by the position of needle valve 17 as this moves progressively to the right with increased engine speed, and hence is determined initially by engine speed. Thus the modulated pressure will be controlled by engine speed, until the output shaft and hence mechanism 26 begins to rotate, in such a manner that gradual engagement of the clutch will take place as the engine speed is raised. During this engagement of the clutch the vehicle will start to move and the clutch output shaft will begin to rotate. Subsequent rotation of carrier 28 of mechanism 26 will cause further axial thrust on valve needle 17 through the centrifugal action of weighted arms 24 on flange 22. The movement of needle valve 17 to the right is therefore accelerated once the clutch begins to engage and thus the ratio of effective areas in between the needle and orifices 15 and 16 will change more rapidly. Thus the pressure in modulated chamber 7, and hence in space 9 of cylinder 10, will fall rapidly and the rate of actual clutch engagement will increase. When the speeds of the engine and clutch output shafts are sufficiently high, needle valve 17 will have moved over to its extreme right hand position at which the taper on needle valve 17 will have seated in orifice 15 thus cutting off the high pressure circulation through the system and, in particular, connecting space 9 in the clutch cylinder directly to exhaust through passage 8, chamber 7, orifice 16 and chamber 13 and permitting full engagement of the clutch.

As the vehicle is slowed down the axial forces exerted by mechanisms 25 and 26 on the needle will be reduced and the needle will move back to the left under the action of spring 31. Since both shafts 29 and 30 are rotating, the rate of fall of the axial force will be the sum of those produced by mechanisms 25 and 26 and the rate of movement of needle 17 will be relatively rapid causing pressurised fluid to flow into space 9 of cylinder 10 and promote rapid disengagement of the clutch.

Referring again to the main features of the invention as shown in the drawing, the clutch engaging characteristic can be varied to give any desired relationship with speed by varying the form of the taper of needle 17. It is possible to control the clutch on engine speed alone in which case centrifugal unit 26 could be omitted.

Having fully described my invention, what I claim and desire to secure by Letters Patent is:

1. A hydraulic clutch mechanism for a friction clutch having input and output sides, the former being driven by a rotating power unit, which mechanism includes a hydraulic motor operatively connected to said clutch and spring-loaded for clutch engagement against clutch disengagement, comprising: a pump driven by said power unit and having inlet and outlet sides, a normally closed bypass valve connected to said outlet, a high pressure chamber connected to said outlet between said pump and said bypass valve, a modulated pressure chamber connected to said high pressure chamber and an exhaust chamber connected to said modulatd chamber, fluid pressure conducting means connecting said modulated pressure chamber with said motor, a pressure regulating valve in the form of a double needle having axial movement to control simultaneously pressure drop between the high pressure chamber and the modulated pressure chamber and between the modulated pressure chamber and the exhaust chamber, a speed sensitive device of the centrifugal weighted arm type driven by said power unit and operatively connected to said needle valve to position the same in accordance with the rotational speed of said power unit, the needle valve being moved towards a first position by an increase above a predetermined speed of said unit to relieve the pressure in said modulated pressure chamber and allow said clutch to move towards engaged position, and being moved towards a second position by a decrease below a predetermined speed of said unit to increase the pressure in said modulated pressure chamber to cause said clutch to move to disengaged position.

2. The clutch mechanism of claim 1 including a second speed sensitive device of the centrifugal weighted arm type driven by the output side of said clutch, said device being operatively connected to said valve to act in conjunction with said first speed sensitive device to assist in the movement of said valve, and during periods of over-run being capable alone of controlling the valve to provide an overriding clutch control.

References Cited in the file of this patent

UNITED STATES PATENTS

| | | |
|---|---|---|
| 1,967,730 | Zadig | July 24, 1934 |
| 2,080,484 | Hunt | May 18, 1937 |
| 2,110,675 | Pike | Mar. 8, 1938 |
| 2,114,221 | Gillett | Apr. 12, 1938 |
| 2,203,296 | Fleischel | June 4, 1940 |
| 2,324,830 | Eaton | July 20, 1943 |